(12) United States Patent
Kang

(10) Patent No.: US 9,549,094 B2
(45) Date of Patent: Jan. 17, 2017

(54) SCANNING APPARATUS AND IMAGE FORMING APPARATUS EMPLOYING THE SAME

(71) Applicant: Samsung Electronics Co., Ltd., Suwon-si, Gyeonggi-do (KR)

(72) Inventor: Jin-gu Kang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/579,216

(22) Filed: Dec. 22, 2014

(65) Prior Publication Data

US 2016/0006899 A1 Jan. 7, 2016

(30) Foreign Application Priority Data

Jul. 1, 2014 (KR) ........................ 10-2014-0081988

(51) Int. Cl.
*H04N 1/04* (2006.01)
*H04N 1/10* (2006.01)
*H04N 1/00* (2006.01)

(52) U.S. Cl.
CPC ............ *H04N 1/10* (2013.01); *H04N 1/00551* (2013.01)

(58) Field of Classification Search
CPC .............................. H04N 1/10; H04N 1/00551
USPC ......... 358/497, 494, 474, 505; 399/379, 380
See application file for complete search history.

(56) References Cited

U.S. PATENT DOCUMENTS

| | | | | |
|---|---|---|---|---|
| 7,136,201 B2 * | 11/2006 | Kawasaki | .......... | H04N 1/00554 358/401 |
| 7,269,378 B2 * | 9/2007 | Baek | ...................... | G03G 15/16 399/121 |
| 7,512,376 B2 * | 3/2009 | Suzuki | ................. | G03G 15/605 16/239 |
| 8,139,994 B2 * | 3/2012 | Suzuki | ................. | G03G 15/605 16/221 |
| 8,375,518 B2 | 2/2013 | Haemmerle | | |
| 2014/0023416 A1 * | 1/2014 | Suzuki | ............... | H04N 1/00554 399/380 |
| 2016/0006899 A1 * | 1/2016 | Kang | ................. | H04N 1/00551 358/474 |

FOREIGN PATENT DOCUMENTS

| | | |
|---|---|---|
| KR | 10-2011-0103952 | 9/2011 |
| KR | 10-2013-0108883 | 10/2013 |

* cited by examiner

*Primary Examiner* — Cheukfan Lee
(74) *Attorney, Agent, or Firm* — Staas & Halsey LLP

(57) ABSTRACT

A scanning apparatus and image forming apparatus are provided. The scanning apparatus includes a scanner body including a platen on which a document is placed, a platen cover that is pivoted between a closed position where the platen is covered and an open position where the platen cover is separated from the platen, a hinge unit that pivotably connects the platen cover to the main body between the closed position and the open position, an elastic member that provides a first elastic force such that the platen cover does not fall due to a self-weight of the platen cover in a first pivot section, and a damping spring that applies to the platen cover a second elastic force that mitigates a fall impact of the platen cover onto the closed position due to the self-weight of the platen cover in a second pivot section.

20 Claims, 13 Drawing Sheets

SCANNING APPARATUS AND IMAGE FORMING APPARATUS EMPLOYING THE SAME

CROSS-REFERENCE TO RELATED APPLICATIONS

This application is related to, and claims the priority benefit of, Korean Patent Application No. 10-2014-0081988, filed on Jul. 1, 2014, in the Korean Intellectual Property Office, the disclosure of which is incorporated herein in its entirety by reference.

BACKGROUND

1. Field

One or more embodiments of the present invention relate to a scanning apparatus reading images from a document and an image forming apparatus employing the scanning apparatus.

2. Description of the Related Art

A scanning apparatus is an apparatus to irradiate light onto a document and receiving light reflected from the document to read images recorded on the document. The scanning apparatus may be classified as a flatbed type, in which a document is located at a fixed position and a scanning member such as a contact type image sensor (CIS) or a charge coupled device (CCD) reads images while moving, a document feed type, in which a scanning member is fixed at a location and a document is moved to be read, and a combined type thereof. A scanning apparatus may be used alone or as a multifunction printer in which a scanning apparatus and a printer or a copier that includes a printing unit printing images on a paper are combined.

The scanning apparatus includes a main body including a platen on which a document is placed and a platen cover that covers the platen. The platen cover may be pivoted between an open position and a closed position. The platen cover may be pivoted to the open position and a document placed on the platen, and the platen cover may be pivoted again to the closed position.

To prevent the platen cover from falling from the open position to the closed position due to its self-weight, a damper structure may be provided in the scanning apparatus. The damper structure gives pivot resistance to the platen cover such that the platen cover does not fall to the closed position in a section at a predetermined opening angle or greater (free stop section). Thus, in a section at an angle less than the predetermined opening angle, the platen cover falls due to its self-weight to thereby be pivoted to the closed position.

SUMMARY

One or more embodiments of the present invention include a scanning apparatus capable of preventing a sudden fall of a platen cover in a free fall section and an image forming apparatus including the scanning apparatus.

Additional aspects will be set forth in part in the description which follows and, in part, will be apparent from the description, or may be learned by practice of the presented embodiments.

According to one or more embodiments of the present invention, a scanning apparatus includes a scanner body including a platen, on which a document is placed, and a hinge bracket; a platen cover including a pivot bracket that is pivotably connected to the hinge bracket, wherein the platen cover is pivoted between a closed position where the platen is covered and an open position where the platen cover is separated from the platen, a first damping unit including a cam member that includes a cam track and is provided on the platen cover, a support member that includes a contact portion contacting the cam track and is liftably mounted to the main body according to rotation of the platen cover, an elastic member that applies an elastic force to the support member in a direction in which the platen cover is supported, wherein the first damping unit prevents a fall of the platen cover to the closed position in a first pivot section that is at a reference opening angle or greater, and a second damping unit that mitigates a fall impact of the platen cover onto the closed position due to a self-weight of the platen cover in a second pivot section that is at the reference opening angle or smaller.

The second damping unit may include a damping spring that provides the platen cover with a damping moment in an opposite direction to a rotational moment due to the self-weight of the platen cover in the second pivot section.

The damping spring may include an elastic arm that contacts the contact portion in the second pivot section to be elastically deformed.

The second damping unit may further include a damping arm that is pivotably mounted to a pivot shaft of the pivot bracket, wherein the damping spring applies an elastic force to the damping arm so as to contact the contact portion in the second pivot section.

The damping spring may include a first arm that is supported by the pivot bracket and a second arm that is supported by the damping arm. An initial angle between the first arm and the second arm may be greater than the reference opening angle, and the pivot bracket may include a support portion that supports the damping arm such that the damping arm does not contact the contact portion in the first pivot section.

The damping spring may include a torsion coil spring including a first arm that is supported by the pivot bracket and a second arm that contacts the contact portion in the second pivot section. An initial angle between the first arm and the second arm may be greater than the reference opening angle, and the pivot bracket may include a support portion that supports the second arm such that the second arm does not contact the contact portion in the first pivot section.

The cam member may include a first cam track that supports the contact portion such that the platen cover does not pivot anymore beyond the open position, and a second cam track corresponding to the first pivot section.

The cam member may further include a third cam track corresponding to the second pivot section. The third cam track may elastically deform the elastic member by pulling the contact portion in order to mitigate a fall impact of the platen cover onto the closed position due to the self-weight of the platen cover.

According to one or more embodiments of the present invention, a scanning apparatus includes, a scanner body including a platen on which a document is placed; a platen cover that is pivoted between a closed position where the platen is covered and an open position where the platen cover is separated from the platen; a hinge unit that pivotably connects the platen cover to the scanner body between the closed position and the open position, an elastic member that provides a first elastic force such that the platen cover does not fall due to a self-weight of the platen cover in a first pivot section at an angle greater than a reference opening angle; and a damping spring that applies to the platen cover a second elastic force that mitigates a fall impact of the platen cover onto the closed position due to the self-weight of the platen cover in a second pivot section that is at the reference opening angle or smaller.

The hinge unit may include a hinge bracket that is provided on the scanner body and a pivot bracket that is provided on the platen cover and is pivotably connected to the hinge bracket, and a cam track may be provided on the pivot bracket, and a support member that is elastically biased in a direction to contact the cam track may be mounted on the hinge bracket by the elastic member, and the elastic member may be elastically deformed in proportion to a variation of a cam radius of the cam track according to rotation of the platen cover so as to support the platen cover.

The damping spring may include an elastic arm that contacts the contact portion in the second pivot section to be elastically deformed so as to apply the second elastic force to the platen cover.

The scanning apparatus may include a damping arm that is pivotably mounted to a pivot shaft of the pivot bracket, wherein the damping spring applies an elastic force to the damping arm so as to contact the contact portion in the second pivot section. The damping spring may include a torsion coil spring including a first arm that is supported by the pivot bracket and a second arm that is supported by the damping arm. An initial angle between the first arm and the second arm may be greater than the reference opening angle, and the pivot bracket may include a support portion that supports the damping arm such that the damping arm does not contact the contact portion in the first pivot section.

The damping spring may include a torsion coil spring including a first arm that is supported by the pivot bracket and a second arm that contacts the contact portion in the second pivot section. An initial angle between the first arm and the second arm may be greater than the reference opening angle, and the pivot bracket may include a support portion that supports the second arm such that the second arm does not contact the contact portion in the first pivot section.

According to one or more embodiments of the present invention, an image forming apparatus includes: the scanning apparatus described above; and a printing unit that forms an image on a recording medium.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
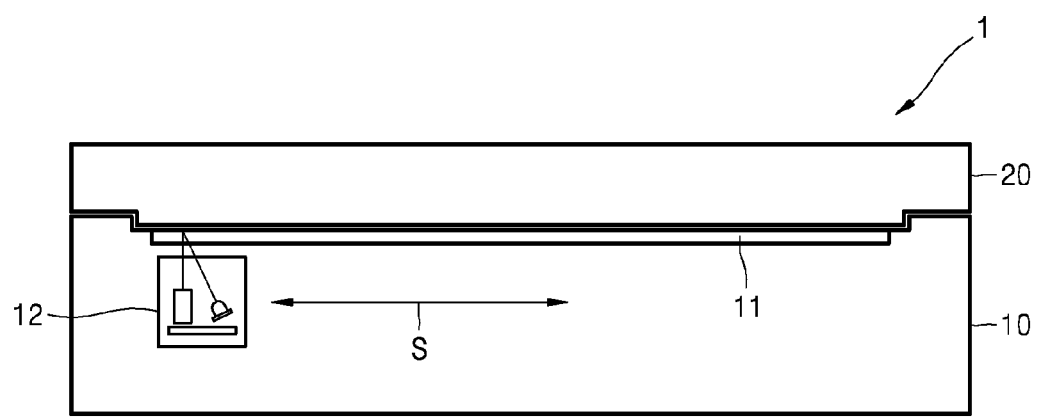
FIG. 1 illustrates a scanning apparatus according to an embodiment.

Reference will now be made in detail to embodiments, examples of which are illustrated in the accompanying drawings, wherein like reference numerals refer to like elements throughout, and sizes or thicknesses of elements may be exaggerated for clarity of description. In this regard, the present embodiments may have different forms and should not be construed as being limited to the descriptions set forth herein. Accordingly, the embodiments are merely described below, by referring to the figures, to explain aspects of the present description.

Figure 2:
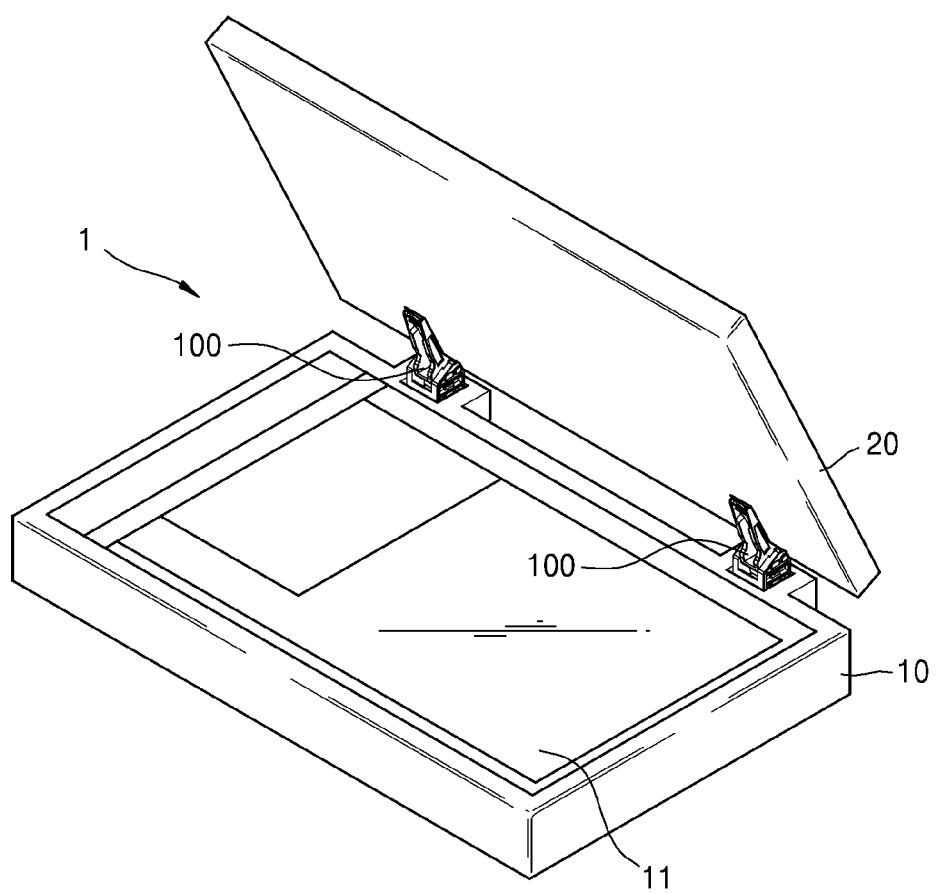
FIG. 2 illustrates an exemplary scanning apparatus illustrated in FIG. 1, illustrating a platen cover that is opened.

FIG. 1 is a schematic structural diagram of a scanning apparatus 1 according to an embodiment. FIG. 2 illustrates an exemplary scanning apparatus 1 having a platen cover 20 that is opened. The scanning apparatus 1 according to an exemplary embodiment is a flatbed type scanning apparatus.

Referring to FIGS. 1 and 2, the scanning apparatus 1 includes a main body 10 and the platen cover 20. The main body 10 includes a platen 11 on which a document is placed and a scanning member 12 that reads images from the document.

The platen 11 may be a planar and transmissive member that supports a document that is to be read. The scanning member 12 irradiates light to a document placed on the platen 11, and receives light reflected by the document to read images of the document. For example, a contact type image sensor (CIS) or a charge coupled device (CCD) may be used as the scanning member 12. The scanning member 12 may be moved under the platen 11 in a sub-scanning direction S, that is, in a length direction of the document, by using a moving unit (not illustrated).

Figure 3:
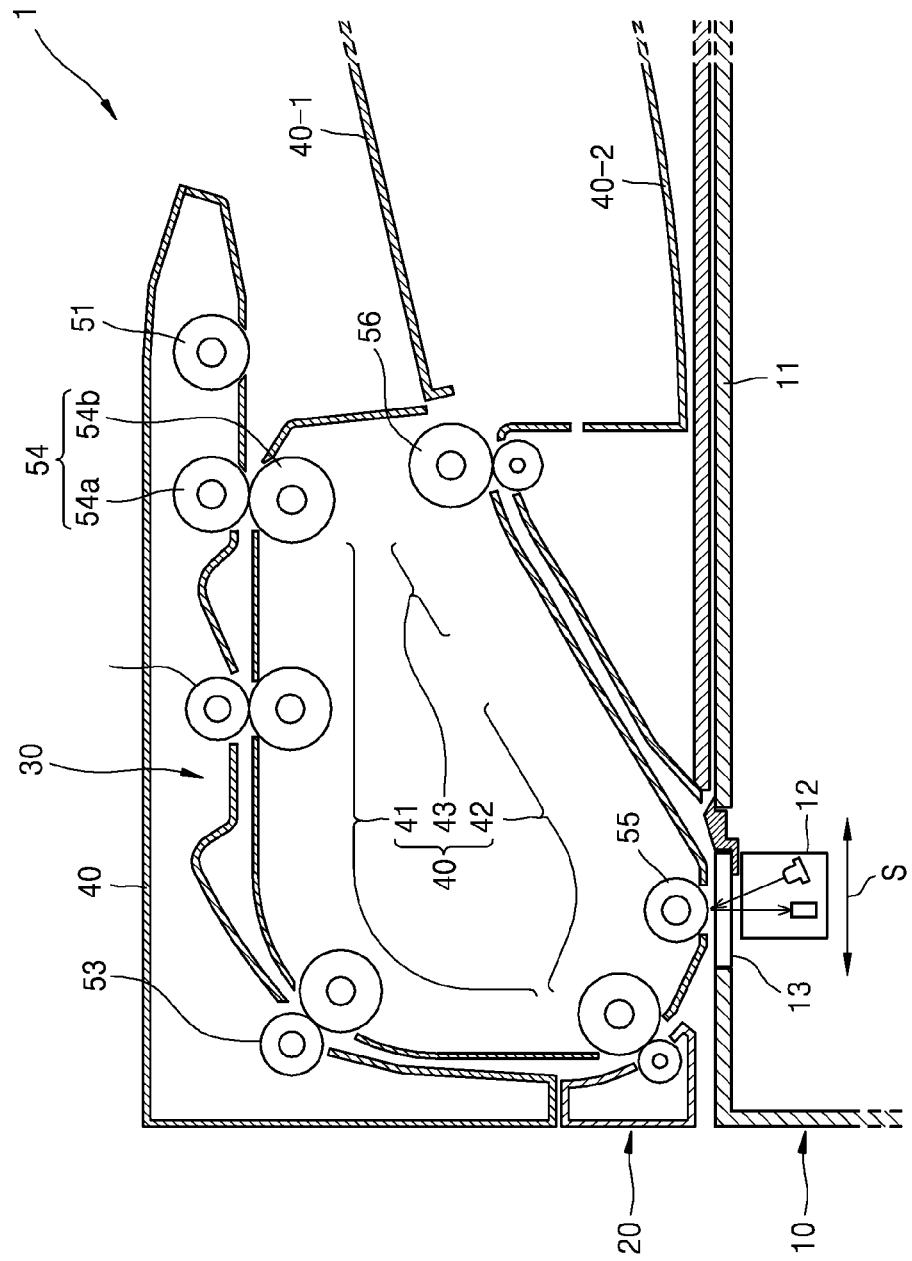
FIG. 3 illustrates a scanning apparatus according to an embodiment.
Figure 4:
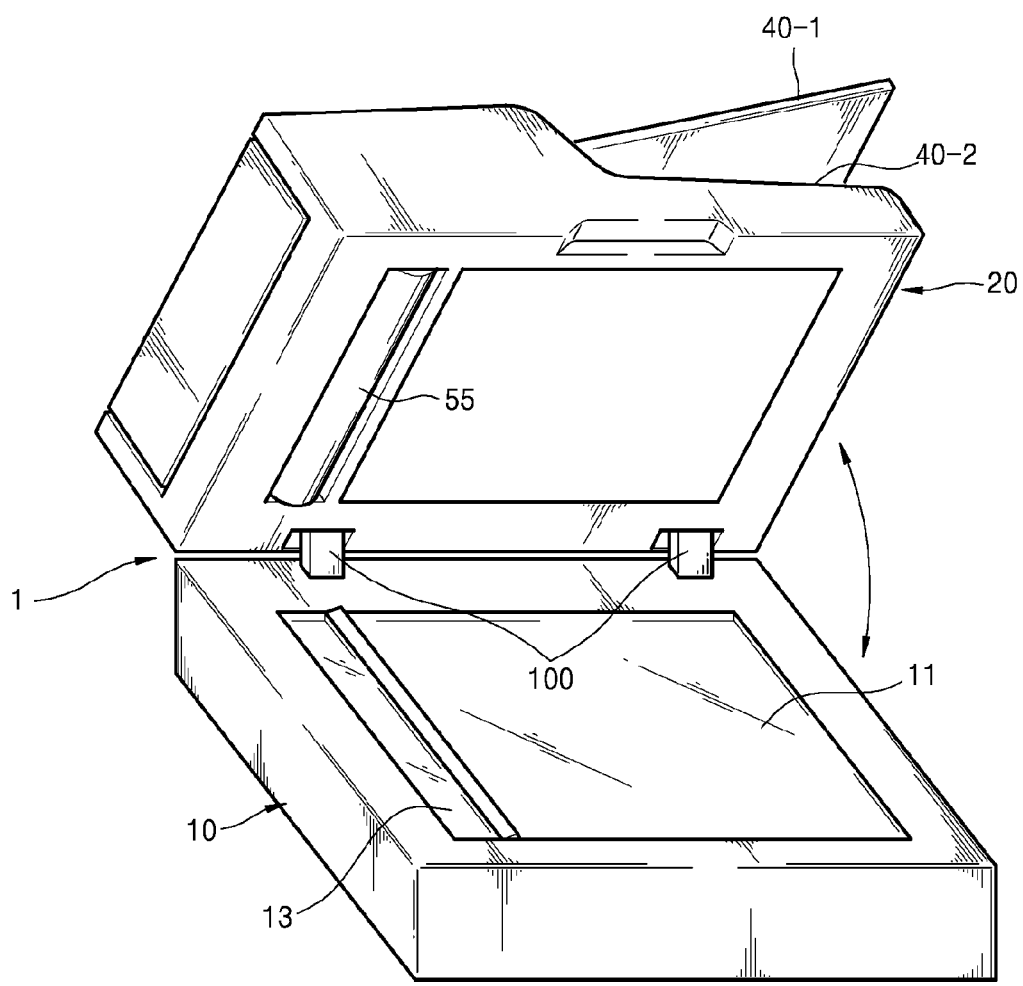
FIG. 4 illustrates an exemplary scanning apparatus having a platen cover that is opened.

FIG. 3 illustrates a scanning apparatus 1 according to an embodiment. FIG. 4 illustrates an exemplary scanning apparatus 1 having a platen cover that is opened. The scanning apparatus 1 according to an exemplary embodiment is a combined type scanning apparatus that uses a flatbed method and a document feeding method.

Referring to FIGS. 3 and 4, a document feeding unit 30 may be disposed on the platen cover 20. The platen 11 and a scanning window 13 to read images from a document by using a document feeding method are provided on the main body 10. The scanning window 13 may be, for example, a transparent member. When a document feeding method is used, the scanning member 12 is disposed under the scanning window 13. When a flatbed method is used, the scanning member 12 may be moved under the platen 11 in a sub-scanning direction S, that is, in a length direction of the document, by using a moving unit (not illustrated).

The document feeding unit 30 transports the document such that the scanning member 12 reads images recorded on the document, and discharges the document, reading of which is completed. The document feeding unit 30 includes a document feeding path 40, and the scanning member 12 reads images from the document that is fed. The document feeding path 40 may include, for example, a supply path 41, a scanning path 42, and a discharge path 43. The scanning member 12 may be disposed on the scanning path 42, and images recorded on a document are read by using the scanning member 12 while the document passes through the scanning path 42. The supply path 41 is a path to supply the document to the scanning path 42. The document loaded in a supply tray 40-1 may be supplied to the scanning path 42 via the supply path 41. The discharge path 43 is a path to discharge the document that has passed through the scanning path 42. Accordingly, the document loaded in the supply tray 40-1 is transported along the supply path 41, the scanning path 42, and the discharge path 43, and discharged to a discharge tray 40-2.

A plurality of document feeding rollers that feed a document may be disposed on the document feeding path 40. For example, a pickup roller 51 that picks up a document loaded in the feeding tray 40-1 and supply rollers 52 and 53 that transport the document that is picked up may be disposed on the supply path 41. Each of the supply rollers 52 and 53 may include a pair of rollers rotating while being in engagement with each other to transfer the document. One of the pair of rollers is a driving roller and the other is a driven roller that is rotated by being compressed by the driving roller. When the supply path 41 is opened in order to remove a paper jam, the driven roller may be separated from the driving roller, or a compression force between the driven roller and the driving roller may be released. An automatic document feed (ADF) unit 54 that separates the document that is picked up one by one may be disposed between the pickup roller 51 and the supply roller 52. The ADF unit 54 may include, for example, a first ADF roller 54*a* and a second ADF roller 54*b* that are engaged with each other to rotate in opposite directions to each other. The first ADF roller 54*a* rotates in a direction in which the document is transported to the supply path 41, and the second ADF roller 54*b* is rotated in an opposite direction thereto. If two or more documents are supplied between the first and second ADF rollers 54*a* and 54*b*, the first and second ADF rollers 54*a* and 54*b* may separate only one document by using a difference in frictional forces and supply the document to the supply roller 52. For example, if a plurality of documents are introduced between the first and second ADF rollers 54*a* and 54*b*, a frictional force between the documents is less than a frictional force between the first ADF roller 54*a* and the document or between the second ADF roller 54*b* and the document. Thus, the document contacting the first ADF roller 54*a* and the document beneath the above document slide along each other, and then, the document contacting the first ADF roller 54*a* is separated and transported toward the supply roller 52. The configuration of the ADF unit 54 is not limited to the example illustrated in FIG. 3, and the ADF unit 54 may have other various structures that are well-known in the art.

A feeding roller 55 that faces the scanning member 12 and transports a document may be disposed on the scanning path 42. For example, the feeding roller 55 is rotated while being elastically pressed against the scanning window 13 and transports the document supplied therebetween.

A discharge roller 56 that discharges the document with which scanning is completed may be disposed on the discharge path 43. The discharge roller 56 may include a driving roller and a driven roller that are rotated while being engaged with each other.

Although not illustrated in the drawings, the supply path 41, the scanning path 42, and the discharge path 43 may include one or more sensors that sense documents.

Although not illustrated in the drawings, the document feeding unit 30 may have a structure in which duplex scanning is possible. For example, a second scanning member (not illustrated) that scans an image from a rear surface of a document may be disposed at a downstream of the scanning member 12 that reads an image from a surface of the document. Alternatively, a resupply path that overturns the document, with which scanning is completed, such that a rear surface of the document faces the scanning member 12 and the document is supplied to the scanning path 42 again may be provided in the document feeding unit 30.

To place a document on the platen 11, the platen 11 may be exposed to the outside. The platen cover 20 may be pivoted between a closed position where the platen 11 is covered, as illustrated n FIGS. 1 and 3, and an open position where the platen 11 is exposed, as illustrated in FIGS. 2 and 4. A hinge unit 100 pivotably connects the platen cover 20 between the closed position and the open position.

Figure 5:
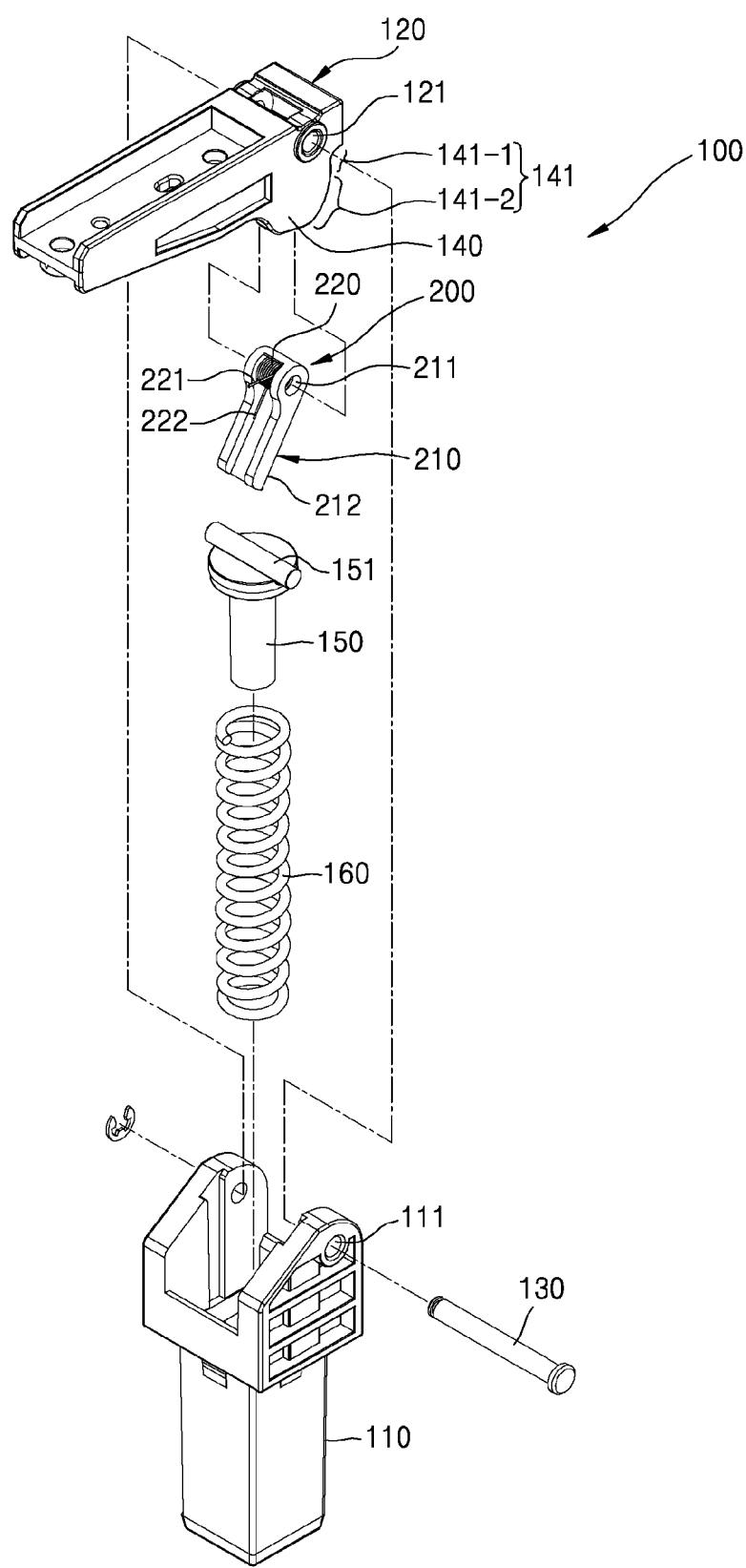
FIG. 5 illustrates a hinge unit according to an embodiment.

FIG. 5 illustrates the hinge unit 100 according to an embodiment. Referring to FIG. 5, the hinge unit 100 includes a hinge bracket 110 and a pivot bracket 120. The hinge bracket 110 may be mounted on the main body 10, and the pivot bracket 120 may be mounted on the platen cover 20. The pivot bracket 120 may be pivotably supported by the hinge bracket 110. For example, the hinge bracket 110 and the pivot bracket 120 respectively have through holes 111 and 121, and a pivot shaft 130 may be inserted into the through holes 111 and 121. The pivot bracket 120 may be pivoted with respect to the pivot shaft 130, and accordingly, the platen cover 20 may be pivoted between an open position and a closed position.

Figure 6:
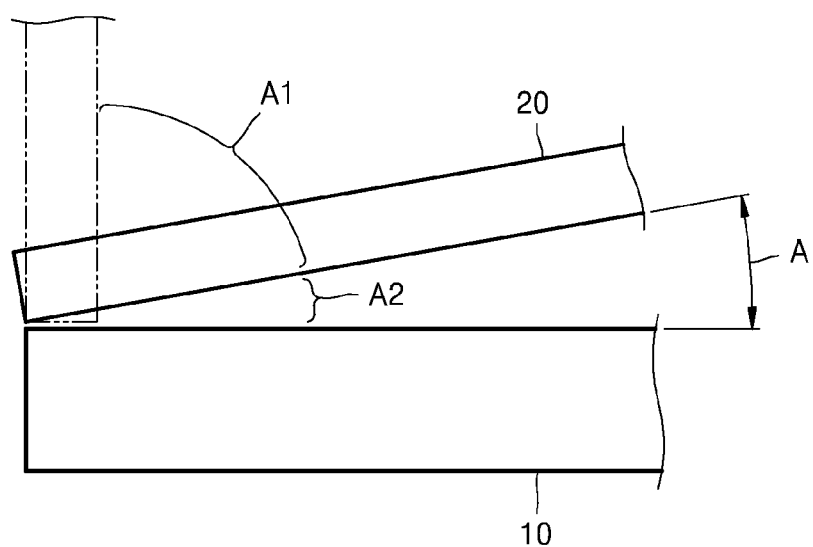
FIG. 6 illustrates an exemplary scanning apparatus, illustrating a pivot section of a platen cover between an open position and a closed position.

FIG. 6 illustrates an exemplary side view of the scanning apparatus 1, illustrating a pivot section of the platen cover 20 between an open position and a closed position. Referring to FIG. 6, the platen cover 20 does not fall to the closed position in spite of its self-weight in a first pivot section A1 (free stop section) that is at a greater angle than a reference opening angle A. In the first pivot section A1, the platen cover 20 is neither pivoted to the open position nor to the closed position and may be maintained at least at an opening angle thereof. Thus, a document may be easily placed on the platen 11.

To prevent a document scanning operation while the platen cover 20 is opened, the platen cover 20 spontaneously falls to the closed position in a second pivot section A2 (closed section) which is at an angle less than the reference opening angle A. The reference opening angle A may be, for example, about 10 degrees.

The hinge unit 100 includes a structure (a first damping unit) that prevents a fall of the platen cover 20 in the first pivot section A1. Referring to FIG. 5, as an example of the first damping unit, a cam member 140 including a cam track 141, a support member 150 including a contact portion 151 that contacts the cam track 141, and an elastic member 160 that applies an elastic force in a direction in which the contact portion 151 contacts the cam track 141, to the support member 150 are illustrated. The cam member 140 may be formed as a single body with the pivot bracket 120 as illustrated in FIG. 5, or may be coupled to the pivot bracket 120 or the platen cover 20 (not illustrated). According to an embodiment, the support member 150 is liftably mounted to the hinge bracket 110. A compression coil spring whose first end portion may be supported by the hinge bracket 110 and whose second end portion may be supported by the support member 150 may be used as the elastic member 160. The elastic member 160 applies an elastic force to the support member 150 in a direction in which the platen cover 20 is supported.

Figure 7:
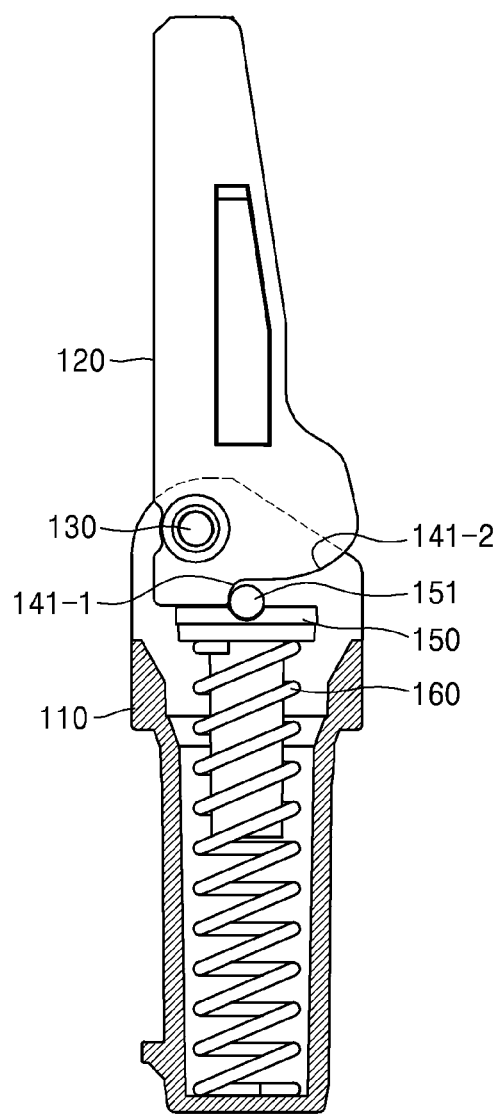
FIG. 7 is a side view of a hinge unit with a platen cover located at an open position.

FIG. 7 is a side view of an exemplary hinge unit 100 with the platen cover 20 located at an open position. Referring to FIGS. 5 and 7, the cam track 141 includes a first cam track 141-1 corresponding to the open position. The open position may be, for example, a position in which an opening angle of the platen cover 20 is 90 degrees. In the open position, the contact portion 151 contacts the first cam track 141-1. The elastic member 160 is pressing the support member 150 towards the first cam track 141-1, and thus, the platen cover 20 does not fall due to its self-weight to the open position but may be maintained at the open position. The first cam track 141-1 may have shape such that the platen cover 20 is pivoted no more than the open position. That is, the first cam track 141-1 operates as a stopper preventing pivoting of the platen cover 20 beyond the open position.

Figure 8:
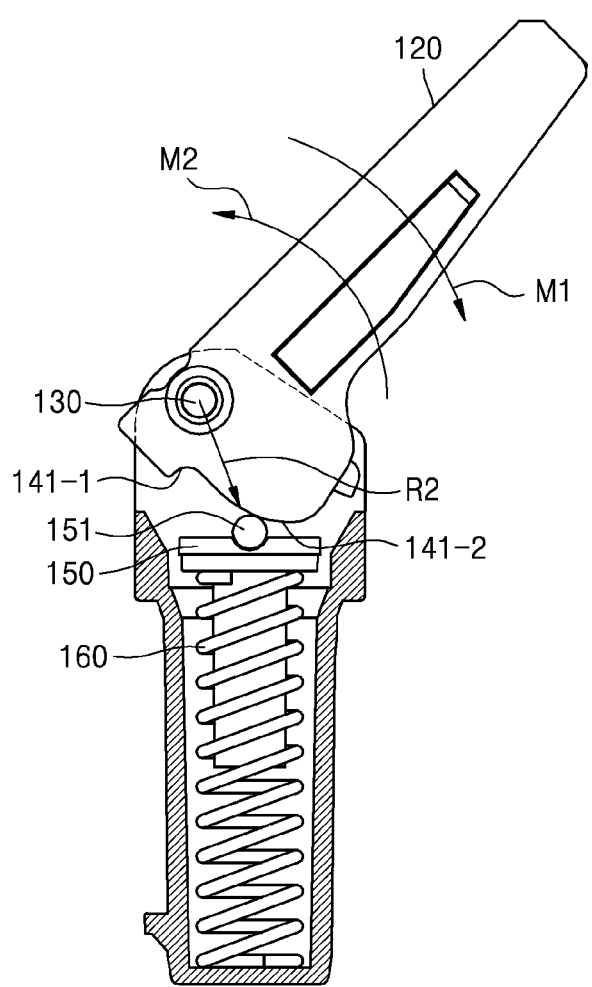
FIG. 8 is a side view of a hinge unit with a platen cover located in a first pivot section.

FIG. 8 is a side view of the hinge unit 100 with the platen cover 20 located in the first pivot section A1. Referring to FIG. 8, the cam track 141 includes a second cam track 141-2 corresponding to the first pivot section A1. As the platen cover 20 is pivoted from the open position to the closed position, that is, as the opening angle of the platen cover 20 is gradually reduced, a length of a moment arm is gradually increased, and accordingly, a rotational moment M1 due to a weight of the platen cover 20 is also gradually increased. In order to prevent a fall of the platen cover 20 to the closed position, a support moment M2, due to an elastic force of the elastic member 160, has to be greater than the rotational moment M1. Thus, the second cam track 140-2 has a shape such that an amount of an elastic force gradually increases as the opening angle of the platen cover 20 is reduced. The elastic member 160 provides a first elastic force in the first pivot section A1 such that the platen cover 20 does not fall to the closed position due to its self-weight.

A cam radius R2 of the second cam track 141-2 with respect to the pivot shaft 130 increases away from the first cam track 141-1. As the platen cover 20 is pivoted toward the closed position, the support member 150 may be pulled in an opposite direction to the elastic force of the elastic member 160 due to the second cam track 141-2, and the elastic force of the elastic member 160 is gradually increased. The cam radius R2 of the second cam track 141-2 and a spring constant of the elastic member 160 are determined such that the support moment M2 is greater than the rotational moment M1 with respect to an arbitrary opening angle in the first pivot section A1. Thus, the platen cover 20 may not fall to the closed position in the first pivot section A1 but may be maintained at the arbitrary opening angle.

Figure 9:
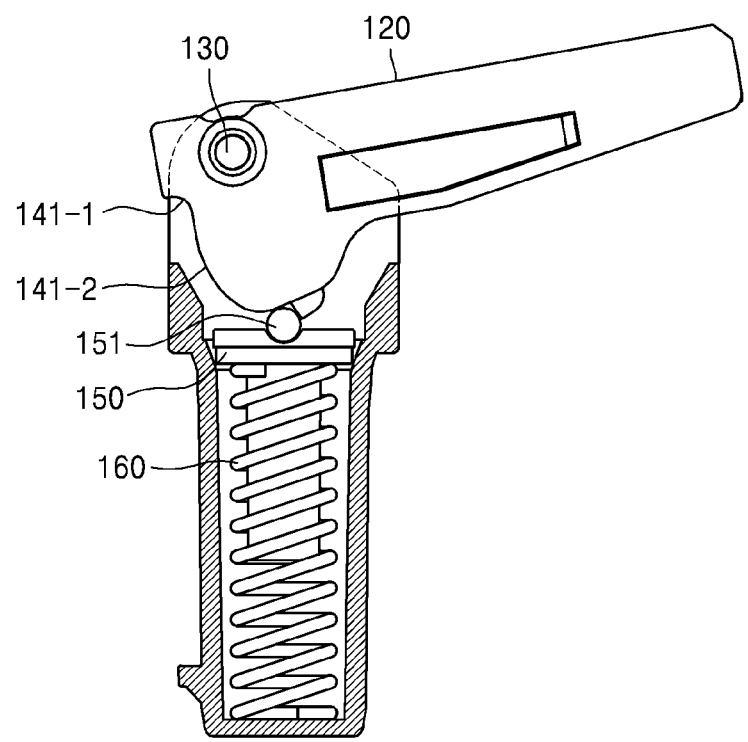
FIG. 9 is a side view of a hinge unit with a platen cover located at a reference opening angle.

FIG. 9 is a side view of an exemplary hinge unit 100 with the platen cover 20 located at the reference opening angle A. Referring to FIG. 9, when a user pivots the platen cover 20 up to the reference opening angle A, the contact portion 151 deviates from the second cam track 141-2, and the platen cover 20 falls due to its self-weight so as to be pivoted to the closed position, illustrated, for example, in FIG. 1 or FIG. 3.

The user pivots the platen cover 20 from the closed position to a position with an opening angle that is greater than at least the reference opening angle A in order to place a document on the platen 11. The platen cover 20 may be stopped at a position where the above opening angle is maintained, or to the opening angle illustrated for example, in FIG. 7. Accordingly, in order to maintain an opened state of the platen cover 20, the user does not have to hold the platen cover 20 and may easily place a document to be scanned on the platen 11, or pick the document from the platen 11 after scanning. After placing a document on the platen 11 for scanning, if the platen cover 20 is pivoted to a position at an angle smaller than the reference opening angle A and the platen cover 20 is released, the platen cover 20 may be pivoted to the closed position due to its self-weight.

The platen cover 20 may be pivoted to the closed position due to its self-weight in the second pivot section A2. An impact due to closing of the platen cover 20 may be applied to the main body 10 and the platen cover 20. The main body 10 and the platen cover 20 may be damaged due to the impact, and noise due to the impact may degrade a product quality. The impact and noise due to the impact increase with the weight of the platen cover 20. As illustrated in FIGS. 3 and 4, the platen cover 20 including the document feeding unit 30 may have a large weight, and thus a closing impact thereof is great, and the possibility of damage to the main body 10 and the platen cover 20 is increased. Thus, a reduction in impact due to closing of the platen cover 20 in a closing section may be desired.

To reduce the closing impact of the platen cover 20, a third cam track (not illustrated) corresponding to the closing section may be provided in the cam member 140. The third cam track may have a structure such that a cam radius with respect to the pivot shaft 130 increases away from the second cam track 141-2. To sufficiently reduce a fall impact of the platen cover 20, a variation of the cam radius may be large. However, the second pivot section A2 may be at angle of about 10 degrees, and if the cam radius in the second pivot section A2 is abruptly changed, a contact angle with respect to the contact portion 151 may be too great that the third cam track operates as a stopper and the platen cover 20 may not be closed by its self-weight. Even if the user pivots the platen cover 20 to the closed position, the platen cover 20 may not be maintained at the closed position, but may be opened due to an elastic force of the elastic member 160.

Referring to FIG. 5, the scanning apparatus 1 according to an exemplary embodiment includes a second damping unit 200 that mitigates a fall impact of the platen cover 20 in the second pivot section A2. The second damping unit 200 does not affect pivoting of the platen cover 20 in the first pivot section A1. The second damping unit 200 mitigates a fall impact of the platen cover 20 by applying to the platen cover 20 a damping moment M3 that is in an opposite direction to the rotational moment M1 which is in a closing direction of the platen cover 20, in the second pivot section A2.

For example, the second damping unit 200 may include a damping arm 210 and a damping spring 220. The damping arm 210 may be pivotably mounted to the pivot shaft 130. For example, a through hole 211 may be formed in the damping arm 210, and the pivot shaft 130 may be sequentially inserted into the through hole 111, the through hole 121, and the through hole 211. Accordingly, the pivot bracket 120 may be pivotably connected to the hinge bracket 110 and the damping arm 210 is pivotably coupled to the pivot shaft 130 at the same time. An end portion 212 of the damping arm 210 does not contact the contact portion 151 in the first pivot section A1, and contacts the contact portion 151 in the second pivot section A2. That is, the end portion 212 of the damping arm 210 does not contact the contact portion 151 if the opening angle of the platen cover 20 is greater than the reference opening angle A, and contacts the contact portion 151 if the opening angle of the platen cover 20 is smaller than the reference opening angle A.

The damping spring 220 applies an elastic force in a direction to contact the contact portion 151, to the damping arm 210. For example, a torsion coil spring having a first arm 221 supported by the pivot bracket 120 and a second arm 222 supported by the damping arm 210 may be used as the damping spring 220.

Figure 10:
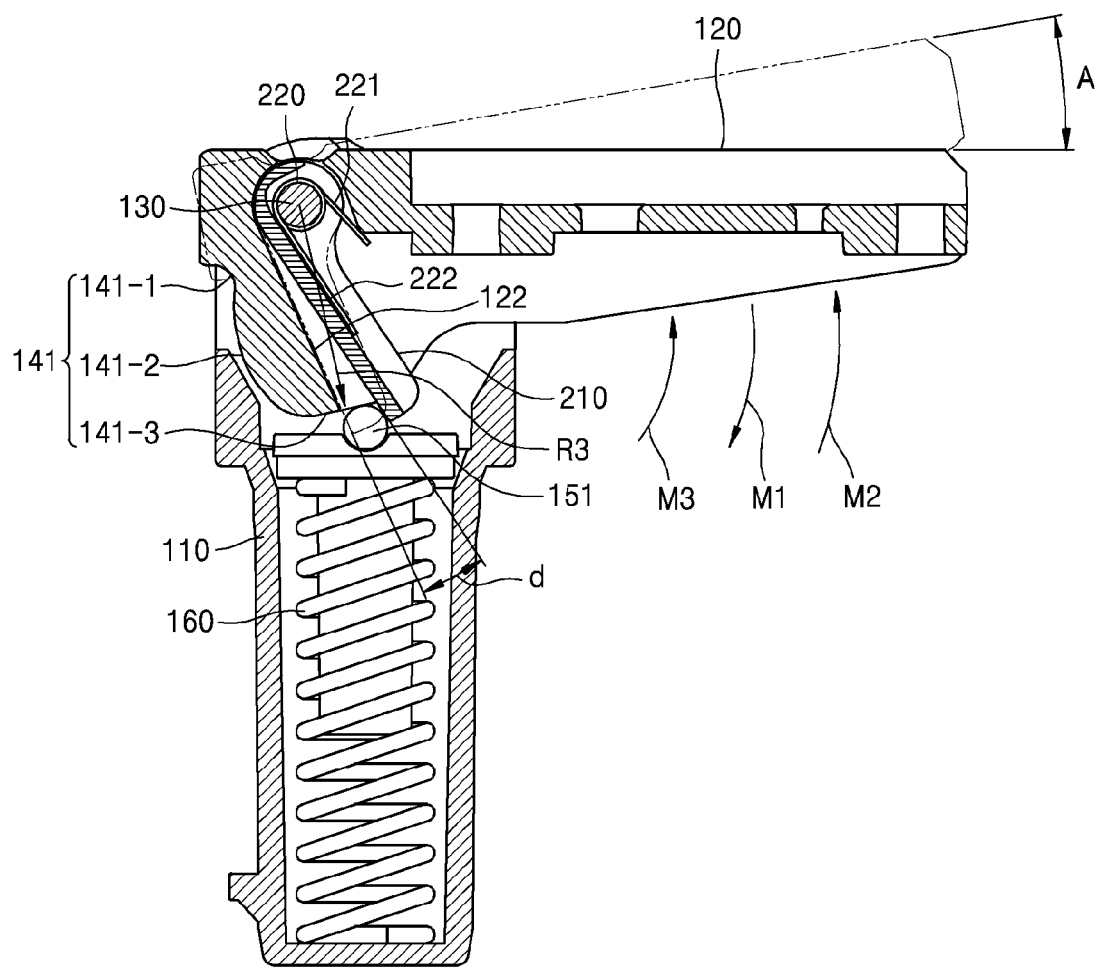
FIG. 10 illustrates a damping unit.

FIG. 10 illustrates a second damping unit 200. Referring to FIG. 10, when the platen cover 20 arrives at the reference opening angle A, the damping arm 210 contacts the contact portion 151. For example, an initial angle between the first and second arms 221 and 222 of the damping spring 220 may be set such that the damping arm 210 contacts the contact portion 151 when the platen cover 20 arrives at the reference opening angle A. Alternatively, a support portion 122 that supports the damping arm 210 may be provided on the pivot bracket 120. If the opening angle of the platen cover 20 is greater than the reference opening angle A, the damping arm 210 is supported by the support portion 122 and does not contact the contact portion 151. When the platen cover 20 arrives at the reference opening angle A, the damping arm 210 contacts the contact portion 151 and starts to separate from the support portion 122. While the platen cover 20 is moving from the reference opening angle A to the closed position due to its self-weight, the damping spring 220 is compressed by a damping angle d, thereby applying a second elastic force to the platen cover 20, the damping moment M3 is applied to the pivot bracket 120 due to the second elastic force. Accordingly, a pivot speed of the platen cover 20 is decreased, and a closing impact of the platen cover 20 is reduced.

The spring constant of the damping spring 220 may be set to satisfy conditions of reducing the closing impact of the platen cover 20 and closing the platen cover 20 up to the closed position of the platen cover 20. For example, as illustrated in Table 1, in an exemplary test, the reference opening angle A was set to 10 degrees, the weight of the platen cover 20 was set to 1.4 kg, a distance between the pivot shaft 130 and a center of gravity of the platen cover 20 at the reference opening angle A, that is, a length of a moment arm was set to about 200 mm, and a closing time and a closing impact of the platen cover 20 were tested by varying a spring constant k of the damping spring 220.

TABLE 1

| k (Nmm/deg) | Closing time (sec) | Whether the platen cover is closed | Closing impact (nnN) |
|---|---|---|---|
| No damping spring | 0.1 | Closed | 670,041 |
| 17.4 | 0.19 | Closed | 302,107 |
| 19.2 | 0.22 | Closed | 254,824 |
| 20.9 | 0.27 | Opened after being closed | — |
| 22.7 | — | Not closed | — |

Referring to Table 1, when the spring constant k of the damping spring 220 is 20.9 mmN/deg, the closing time of the platen cover 20 is 0.27 sec, and a large damping effect that is about 2.7 times greater is obtained compared to when the damping spring 220 is not included. However, after the platen cover 20 is closed, the platen cover 20 is opened again due to an elastic force of the damping spring 220. When the spring constant k of the damping spring 220 is 22.7 mmN/deg, the elastic force of the damping spring 220 is too large that the platen cover 20 is not closed. Thus, the spring constant k of the damping spring 220 may be 17.4 mmN/deg or 19.2 mmN/deg so that at least the platen cover 20 may be closed by its self-weight. When the spring constant k of the damping spring 220 is 17.4 mmN/deg, the closing time is about 1.9 times greater and the closing impact is reduced by about 53% compared to when the damping spring 220 is not included. When the spring constant k of the damping spring 220 is 19.2 mmN/deg, the closing time is about 2.2 times greater and the closing impact is reduced by about 62% compared to when the damping spring 220 is not included. Thus, risk of damage and impact noise of the scanning apparatus 1 due to the closing impact of the platen cover 20 in the second pivot section A2 may be reduced, and furthermore, risk of injury to the user during closing of the platen cover 20 may also be reduced.

The cam track 141 of the hinge unit 100 may assist a damping function. Referring to FIG. 10, the cam track 141 may include a third cam track 141-3 corresponding to the second pivot section A2. A cam radius R3 of the third cam track 141-3 with respect to the pivot shaft 130 increases away from the second cam track 141-2. While the platen cover 20 is pivoted from the reference opening angle A to the closed position, the support member 150 may be pulled in an opposite direction to the elastic force of the elastic member 160 along the third cam track 141-3. Accordingly, the elastic member 160 applies the support moment M2 which is in the opposite direction to the rotational moment M1 to the pivot bracket 120, and may mitigate the closing impact of the platen cover 20. The spring constant k of the damping spring 220 may be determined in consideration of the amount of the support moment M2.

Figure 11:
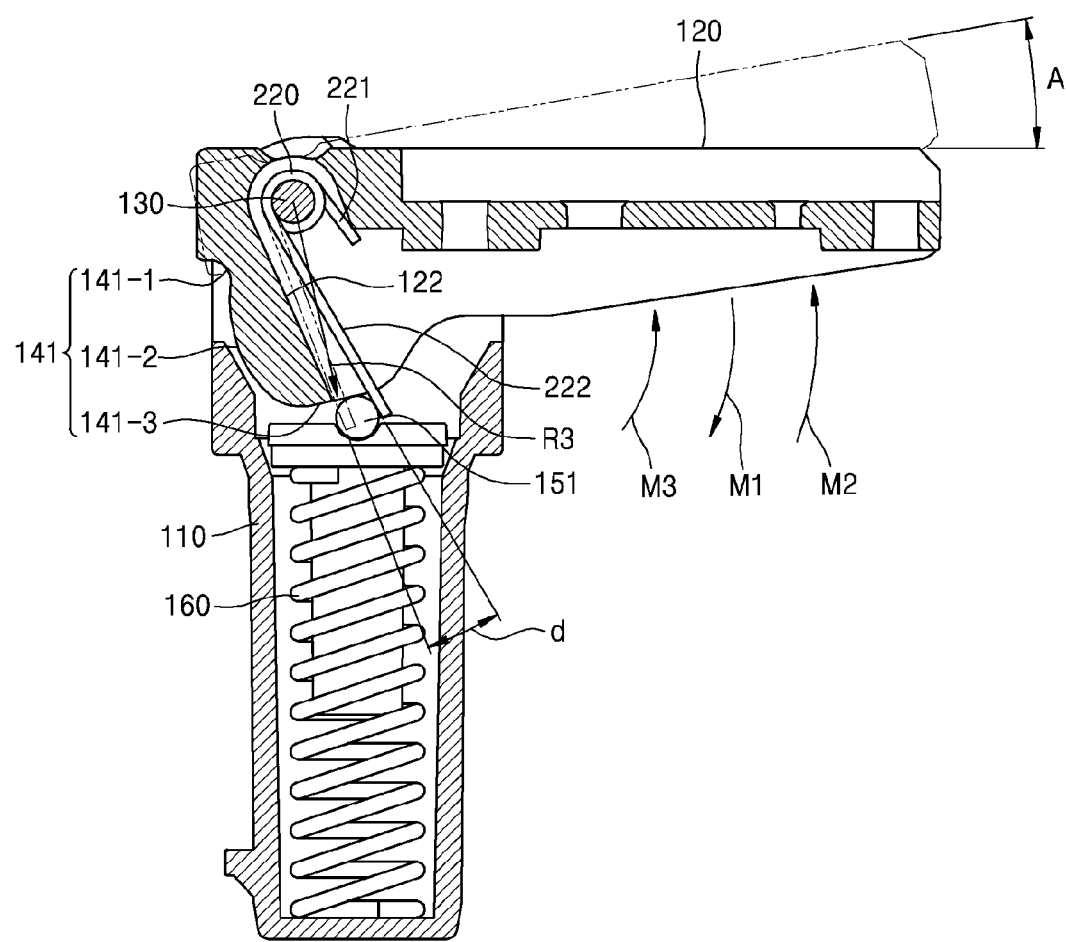
FIG. 11 is a side view of a damping unit according to an embodiment.

The structure of the second damping unit 200 is not limited to the embodiment illustrated in FIG. 5. For example, FIG. 11 is a side view of the second damping unit 200 according to an embodiment. Referring to FIG. 11, the damping spring 220 may directly contact the contact portion 151 in the second pivot section A2. According to an embodiment, a torsion coil spring having a first arm 221 supported by the pivot bracket 120 and a second arm 222 that contacts the contact portion 151 in the second pivot section A2 may be used as the damping spring 220. When the platen cover 20 arrives at the reference opening angle A, the second arm 222 contacts the contact portion 151. For example, an initial angle between the first and second arms 221 and 222 of the damping spring 220 may be set such that the second arm 222 contacts the contact portion 151 when the platen cover 20 arrives at the reference opening angle A. Alternatively, a support portion 122 that supports the second arm 222 may be provided on the pivot bracket 120. If the opening angle of the platen cover 20 is greater than the reference opening angle A, the second arm 222 is supported by the support portion 122 and does not contact the contact portion 151. When the platen cover 20 arrives at the reference opening angle A, the second arm 222 contacts the contact portion 151 and starts to separate from the support portion 122. While the platen cover 20 is moved from the reference opening angle A to the closed position due to its self-weight, the damping spring 220 is compressed by a damping angle d to apply the damping moment M3 to the pivoting bracket 120. Accordingly, a pivot speed of the platen cover 20 is decreased, and a closing impact of the platen cover 20 is reduced.

Figure 12:
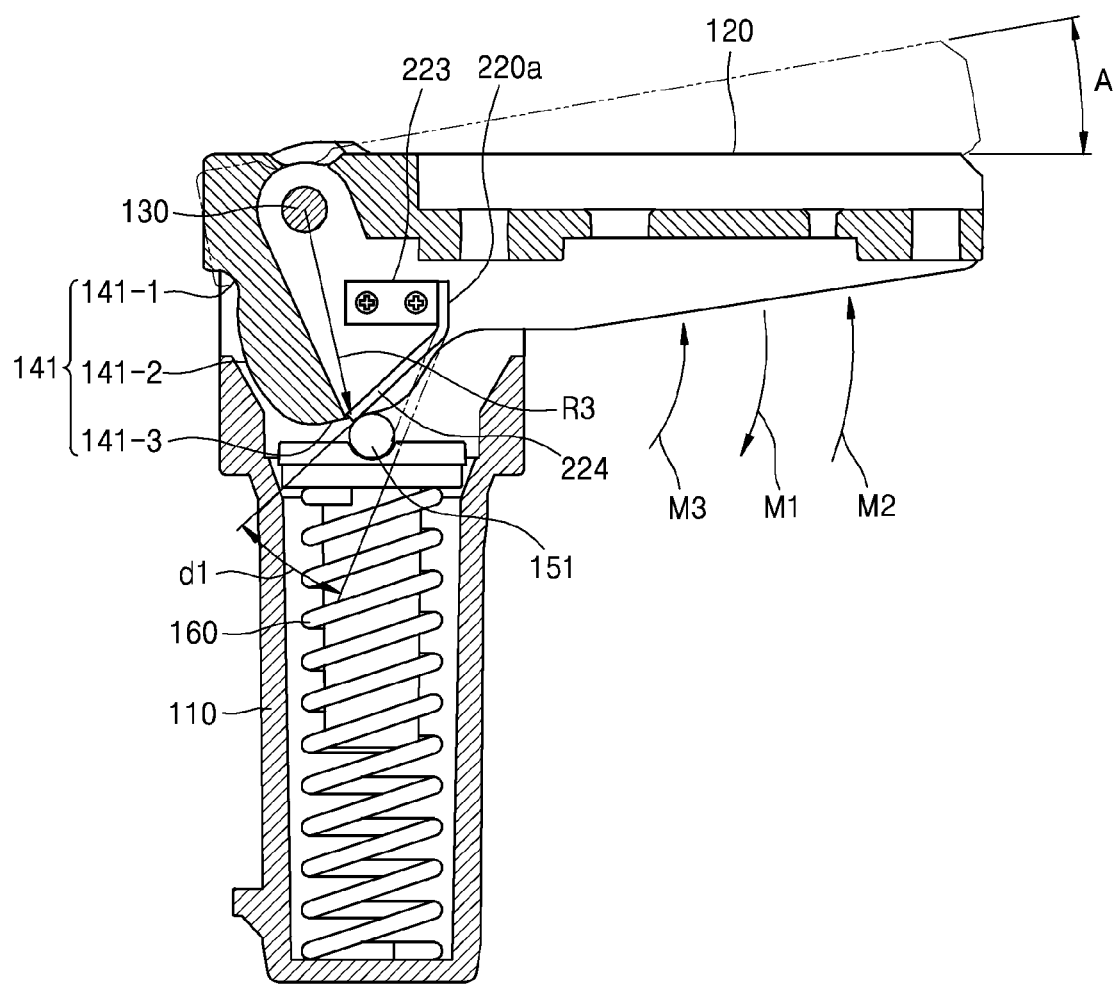
FIG. 12 is a side view of a damping unit according to an embodiment.

The damping spring 220 is not limited to the embodiments illustrated in FIGS. 10 and 11. FIG. 12 is a side view of the second damping unit 200 according to an embodiment. Referring to FIG. 12, a damping spring 220a includes a body 223 that is fixed to the pivot bracket 120 and an elastic arm 224 that extends from the body 223 to contact the contact portion 151. When the platen cover 20 is pivoted from the reference opening angle A to the closed position, the elastic arm 224 contacts the contact portion 151 to deform by a damping angle d1, and applies the damping moment M3 to the pivot bracket 120. Accordingly, a pivot speed of the platen cover 20 is decreased, and a closing impact of the platen cover 20 is reduced.

Figure 13:
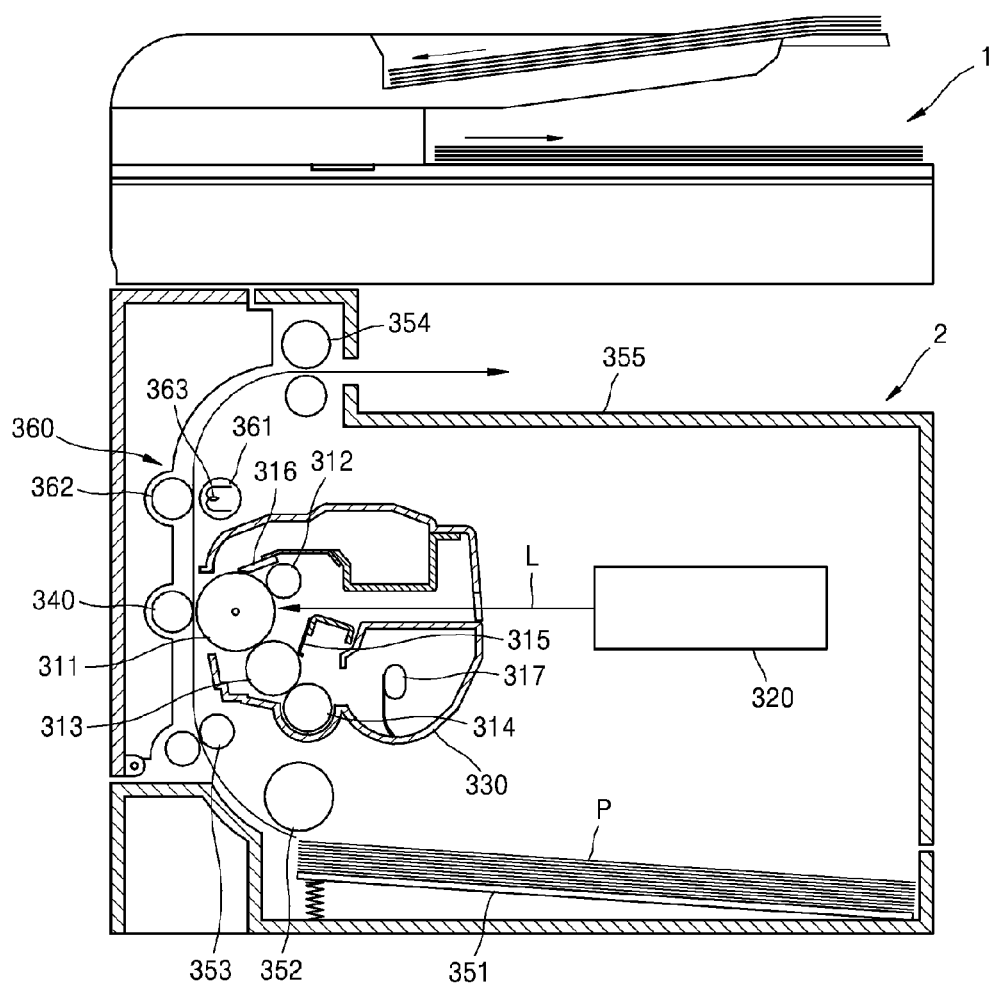
FIG. 13 is a schematic structural diagram of an image forming apparatus according to an embodiment of the present invention.

FIG. 13 is a schematic structural diagram of an image forming apparatus according to an embodiment of the present invention. Referring to FIG. 13, the scanning apparatus 1 and a printing unit 2 are illustrated. The printing unit 2 according to an embodiment is an electrophotographic printing unit that prints an image on a paper by using an electrophotographic method. The scanning apparatus 1 may be positioned above the printing unit 2. The scanning apparatus 1 is, for example, the scanning apparatus 1 illustrated in FIGS. 3 and 4.

The printing unit 2 includes a photosensitive drum 311, a charging roller 312, an exposure unit 320, a developing unit 330, and a transfer roller 340. The photosensitive drum 311 is an example of a photosensitive body on which an electrostatic latent image is formed, and includes a photosensitive layer having a photoconductivity formed on an outer circumference of a cylindrical metal pipe. The charging roller 312 is an example or a charger for charging a surface of the photosensitive drum 311 to a uniform potential. A charge bias applied to the charge roller 312. A corona charger (not illustrated) may be used instead of the charging roller 312.

The exposure unit 320 irradiates light (L) that is modulated according to image information to the surface of the photosensitive drum 311, which is charged to a uniform potential, to form an electrostatic latent image. A laser scanning unit (LSU) that deflect light emitted from a laser diode in a main scanning direction by using a polygon mirror and scans the deflected light onto the photosensitive drum 311 may be used as the exposure unit 320.

The developing unit 330 supplies a toner to the electrostatic latent image formed on the photosensitive drum 311 to develop the electrostatic latent image. The developing unit 330 accommodates a toner. A developing roller 313 supplies the toner to the electrostatic latent image formed on the photosensitive drum 311 to develop the electrostatic image as a visible toner image. An embodiment adopts a non-contact developing method, that is, a surface of the developing roller 313 is separated hundreds of μm from the surface of the photosensitive drum 311. The separation may be referred to as a developing gap. When a developing bias voltage is applied to the developing roller 313, the toner may be transferred and attached to the electrostatic latent image formed on the photosensitive drum 311 via the developing gap. If a contact type developing method is used, the developing roller 313 contacts the photosensitive drum 311. The developing unit 330 may include a supplying roller 314 to attach the toner to the developing roller 313. A supply bias voltage may be applied to the supplying roller 314 in order to attach the toner to the developing roller 313. A regulating member 315 regulates an amount of the toner attached to the surface of the developing roller 313. The regulating member 315 may be a regulating blade having a front edge that contacts the developing roller 313 with a predetermined pressure. A cleaning member 316 removes remaining toner and impurities from the surface of the photosensitive drum 311 before charging the photosensitive drum 311. The cleaning member 316 may be, for example, a cleaning blade having a front edge contacting the surface of the photosensitive drum 311. An agitator 317 conveys the toner to the developing roller 313. The agitator 317 agitates the toner to charge the toner to a predetermined potential.

The transfer roller 340 is an example of a transfer unit that faces the surface of the photosensitive drum 311 to form a transfer nip. A transfer bias voltage is applied to the transfer roller 340 in order to transfer the toner image formed on the surface of the photosensitive drum 311 onto a recording medium P. A corona transfer unit may be used instead of the transfer roller 340.

The printing medium P on which an image is to be printed is withdrawn from a paper cassette 351 by a pickup roller 352. The recording medium P is supplied to a region where the transfer roller 340 and the photosensitive drum 311 face each other by a feeding roller 353. The toner image on the photosensitive drum 311 is transferred onto the surface of the recording medium P by the transfer bias voltage applied to the transfer roller 340, and is maintained on the surface of the recording medium P due to an electrostatic attraction.

A fusing unit 360 applies heat and pressure to the toner image so that the toner image may be fused in the recording medium P, and thus, a permanent printing image is formed on the recording medium P. The fusing unit 360 may be configured so that a heating roller 361 including a heating unit 363 therein and a compression roller 362 are engaged to each other to form a fusing nip. The recording medium P passed through the fusing unit 360 is discharged to a discharge tray 355 by a discharge roller 354.

According to an exemplary image forming apparatus, a printing operation, a copying operation, and a scanning operation may be performed. The printing operation is an operation of printing images on a medium based on image information transmitted from an external host (not illustrated). The copying operation is an operation of reading image information from a document by using the scanning apparatus 1 and transferring the read image information to the printing unit 2 to print the image on a medium. The scanning operation is an operation of reading image information from a document, for example, the read image information may be transmitted to a host (not illustrated). A communication unit (not illustrated) may be included so a fax transmission function for transmitting the read image information via a communication line such as a telephone line and a fax reception function for printing image information received via the telephone line by using the printing unit 2 may be performed.

In the above described embodiment, a monochromatic electrophotographic printing unit 2 including one developing unit 330 is described, however, the embodiments of the present invention are not limited thereto. In a full-color electrophotographic printing unit, four developing units 330 respectively accommodating cyan, magenta, yellow, and black toners, for example, may be used. A printing unit 2 may use another kind of image forming method, for example, an inkjet method or a thermal transfer method.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A scanning apparatus including:
    a scanner body including a platen, on which a document is placed, and a hinge bracket;
    a platen cover including a pivot bracket that is pivotably connected to the hinge bracket, wherein the platen cover is pivoted between a closed position where the platen is covered and an open position where the platen cover is separated from the platen;

a first damping unit including a cam member that includes a cam track and is provided on the platen cover, a support member that includes a contact portion contacting the cam track and is liftably mounted to the main body according to rotation of the platen cover, an elastic member that applies an elastic force to the support member in a direction in which the platen cover is supported, wherein the first damping unit prevents a fall of the platen cover to the closed position in a first pivot section that is at a reference opening angle or greater; and a second damping unit that mitigates a fall impact of the platen cover onto the closed position due to a self-weight of the platen cover in a second pivot section that is at the reference opening angle or smaller.

2. The scanning apparatus of claim 1, wherein the second damping unit comprises a damping spring that provides the platen cover with a damping moment in an opposite direction to a rotational moment due to the self-weight of the platen cover in the second pivot section.

3. The scanning apparatus of claim 2, wherein the damping spring comprises an elastic arm that contacts the contact portion in the second pivot section to be elastically deformed.

4. The scanning apparatus of claim 2, wherein the second damping unit further comprises a damping arm that is pivotably mounted to a pivot shaft of the pivot bracket, wherein the damping spring applies an elastic force to the damping arm so as to contact the contact portion in the second pivot section.

5. The scanning apparatus of claim 4, wherein the damping spring includes a first arm that is supported by the pivot bracket and a second arm that is supported by the damping arm.

6. The scanning apparatus of claim 5, wherein an initial angle between the first arm and the second arm is greater than the reference opening angle, and the pivot bracket includes a support portion that supports the damping arm such that the damping arm does not contact the contact portion in the first pivot section.

7. The scanning apparatus of claim 2, wherein the damping spring comprises a torsion coil spring including a first arm that is supported by the pivot bracket and a second arm that contacts the contact portion in the second pivot section.

8. The scanning apparatus of claim 7, wherein an initial angle between the first arm and the second arm is greater than the reference opening angle, and the pivot bracket includes a support portion that supports the second arm such that the second arm does not contact the contact portion in the first pivot section.

9. The scanning apparatus of claim 1, wherein the cam member comprises:

a first cam track that supports the contact portion such that the platen cover does not pivot anymore beyond the open position, and a second cam track corresponding to the first pivot section.

10. The scanning apparatus of claim 9, wherein the cam member further comprises a third cam track corresponding to the second pivot section.

11. The scanning apparatus of claim 10, wherein the third cam track elastically deforms the elastic member by pulling the contact portion in order to mitigate a fall impact of the platen cover onto the closed position due to the self-weight of the platen cover.

12. A scanning apparatus including:

a scanner body including a platen on which a document is placed;

a platen cover that is pivoted between a closed position where the platen is covered and an open position where the platen cover is separated from the platen;

a hinge unit that pivotably connects the platen cover to the scanner body between the closed position and the open position;

an elastic member that provides a first elastic force such that the platen cover does not fall due to a self-weight of the platen cover in a first pivot section at an angle greater than a reference opening angle; and a damping spring that applies to the platen cover a second elastic force that mitigates a fall impact of the platen cover onto the closed position due to the self-weight of the platen cover in a second pivot section that is at the reference opening angle or smaller.

13. The scanning apparatus of claim 12, wherein the hinge unit includes a hinge bracket that is provided on the scanner body and a pivot bracket that is provided on the platen cover and is pivotably connected to the hinge bracket, and wherein a cam track is provided on the pivot bracket, and wherein a support member that is elastically biased in a direction to contact the cam track is mounted on the hinge bracket by the elastic member, and wherein the elastic member is elastically deformed in proportion to a variation of a cam radius of the cam track according to rotation of the platen cover so as to support the platen cover.

14. The scanning apparatus of claim 13, wherein the damping spring includes an elastic arm that contacts the contact portion in the second pivot section to be elastically deformed so as to apply the second elastic force to the platen cover.

15. The scanning apparatus of claim 13, further including a damping arm that is pivotably mounted to a pivot shaft of the pivot bracket, wherein the damping spring applies an elastic force to the damping arm so as to contact the contact portion in the second pivot section.

16. The scanning apparatus of claim 15, wherein the damping spring comprises a torsion coil spring including a first arm that is supported by the pivot bracket and a second arm that is supported by the damping arm.

17. The scanning apparatus of claim 16, wherein an initial angle between the first arm and the second arm is greater than the reference opening angle, and the pivot bracket includes a support portion that supports the damping arm such that the damping arm does not contact the contact portion in the first pivot section.

18. The scanning apparatus of claim 13, wherein the damping spring comprises a torsion coil spring including a first arm that is supported by the pivot bracket and a second arm that contacts the contact portion in the second pivot section.

19. The scanning apparatus of claim 18, wherein an initial angle between the first arm and the second arm is greater than the reference opening angle, and the pivot bracket includes a support portion that supports the second arm such that the second arm does not contact the contact portion in the first pivot section.

20. An image forming apparatus including:

a scanning apparatus comprising:

a scanner body including a platen, on which a document is placed, and a hinge bracket;

a platen cover including a pivot bracket that is pivotably connected to the hinge bracket, wherein the platen cover is pivoted between a closed position where the platen is covered and an open position where the platen cover is separated from the platen, a first damping unit including a cam member that includes a cam track and is provided on the platen cover, a support member that includes a contact portion contacting the cam track and is liftably mounted to the main body according to rotation of the platen cover, an elastic member that applies an elastic force to the support member in a direction in which the platen cover is supported, wherein the first damping unit prevents a fall of the platen cover to the closed position in a first pivot section that is at a reference opening angle or greater, and a second damping unit that mitigates a fall impact of the platen cover onto the closed position due to a self-weight of the platen cover in a second pivot section that is at the reference opening angle or smaller; and a printing unit that forms an image on a recording medium.

* * * * *